United States Patent [19]

Kanoh

[11] Patent Number: 4,891,534
[45] Date of Patent: Jan. 2, 1990

[54] CIRCUIT FOR COMPARING MAGNITUDES OF BINARY SIGNALS

[75] Inventor: Toshiyuki Kanoh, Tokyo, Japan

[73] Assignee: NEC Corporation, Japan

[21] Appl. No.: 229,337

[22] Filed: Aug. 5, 1988

[30] Foreign Application Priority Data

Aug. 7, 1987 [JP] Japan .................. 62-196460

[51] Int. Cl.$^4$ .................................. H03K 5/24
[52] U.S. Cl. ............................ 307/355; 307/449; 340/146.2
[58] Field of Search ............... 307/350, 355, 448, 449, 307/463, 471; 340/146.2

[56] References Cited

U.S. PATENT DOCUMENTS 3,517,175  6/1970  Williams ..................... 340/146.2
4,017,830  4/1977  Shigemori et al. ............ 340/146.2

*Primary Examiner*—John Zazworsky
*Attorney, Agent, or Firm*—Ostrolenk, Faber, Gerb & Soffen

[57] ABSTRACT

A circuit for comparing the magnitudes of two binary signals using five n-channel MOSFET transistors, one p-channel MOSFET transistor and two inverters. The circuit includes two input terminals, an auxiliary input terminal, an output terminal, and terminals for connecting the comparing circuit to a power supply and ground. When the binary signal applied to the first input terminal exceeds the binary signal applied to the second input terminal, the output is a first logic level. Conversely, when the binary signal applied to the second input terminal exceeds the binary signal applied to first input terminal, the output is a second logic level opposite to the first level. If the binary signals applied to the first and second input terminals are the same logic level, the output is the same logic level as the binary signal applied to the auxiliary input terminal. The circuit can be arranged in various configurations, including one in which a resistor is used in place of the p-channel MOSFET. A number one-bit comparing circuits can be cascaded together to form an n-bit comparing circuit.

14 Claims, 2 Drawing Sheets

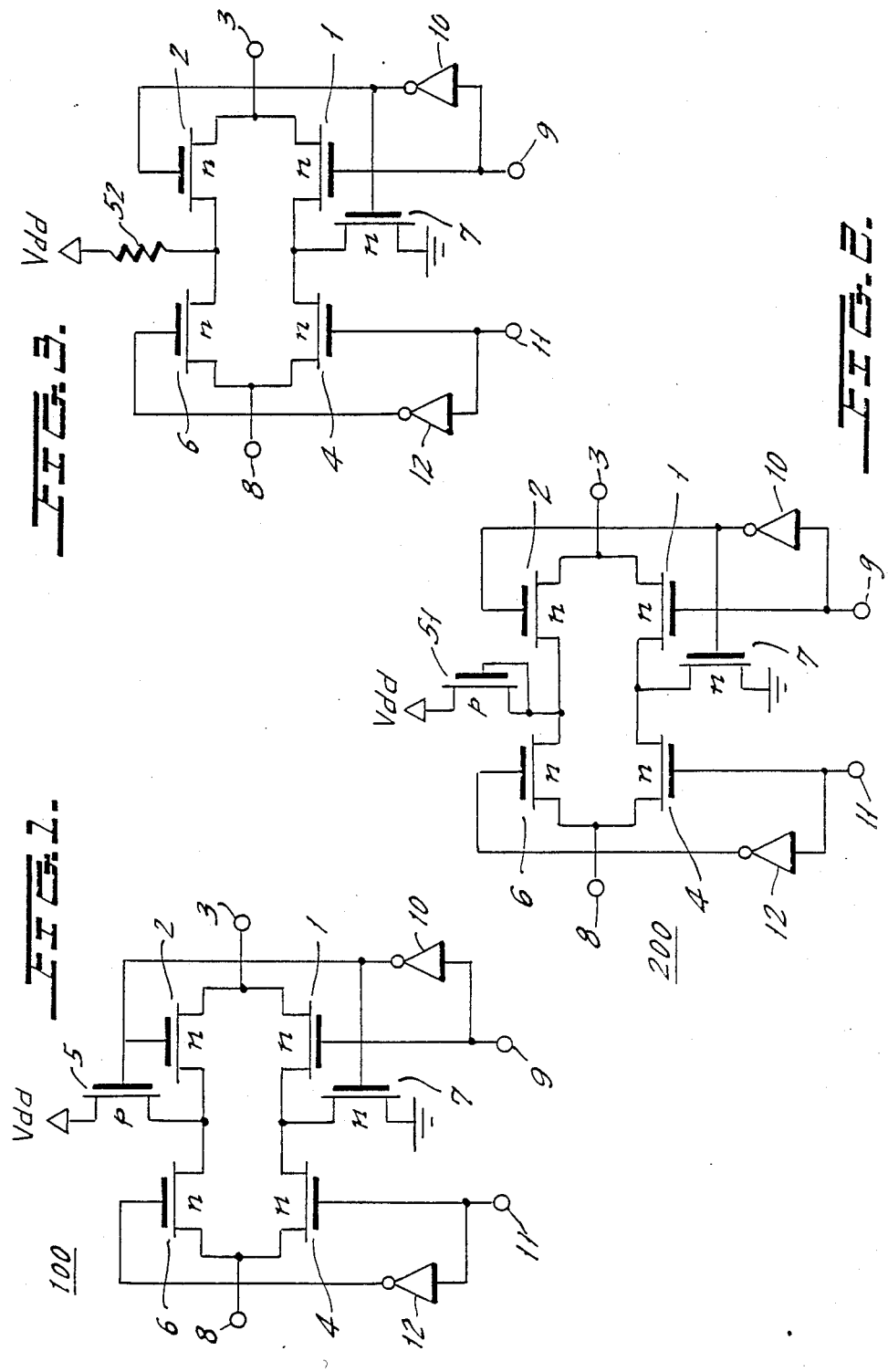

CIRCUIT FOR COMPARING MAGNITUDES OF BINARY SIGNALS

BACKGROUND OF THE INVENTION

The present invention relates to a circuit for comparing the magnitudes of two n-bit binary signals each being constituted by an n-bit binary number (n=1, 2, 3 . . .).

A circuit for comparing binary signals of the kind described has customarily been constructed and integrated by combining a plurality of logic gates such as AND gates and NAND gates. Typical of prior art comparing circuits is a μPD4063BC/4063BG which is disclosed in "CMOS DIGITAL IC 1986" published Dec. 10, 1985, pp. 147 to 151. The binary signal comparing circuit produces either a logical 1-bit signal of ONE or ZERO depending upon whether one of two binary signals is greater or smaller than the other.

A drawback with the prior art comparing circuits for the above application is that several ten logic gates are required to compare 4-bit binary numbers and, hence, such a circuit cannot be integrated without needing a prohibitive number of transistors. The result is an increase in current consumption as well as in chip area required. In addition, when the number of bits of each binary signal is increased, wiring becomes complicated making the design of an integrated circuit difficult.

SUMMARY OF THE INVENTION

It is therefore an object of the present invention to provide a binary signal comparing logic circuit which reduces the number of transistors and thereby the current consumption and chip area.

It is another object of the present invention to provide a binary signal comparing logic circuit which is easy to design despite any possible increase in the number of bits.

In accordance with the present invention, there is provided a circuit for comparing first and second binary signals, comprising a first n-channel MOS transistor having a gate electrode to which the first binary signal is applied, a second n-channel MOS transistor having a source electrode connecting to a source electrode of the first MOS transistor, and a gate electrode to which a third binary signal different in logical level from the first binary signal is applied, a third n-channel MOS transistor having a source electrode connecting to a drain electrode of the first MOS transistor, and a gate electrode to which the second binary signal is applied, a fourth n-channel MOS transistor having a source electrode connecting to a drain electrode of the second MOS transistor, and a gate electrode to which a fourth binary signal different in logical level from the second binary signal is applied, an output port connected to a drain electrode of the third MOS transistor and a drain electrode of the fourth MOS transistor, a fifth n-channel MOS transistor having a drain electrode connecting to the drain electrode of the first MOS transistor and the source electrode of the third MOS transistor, a gate electrode to which the third binary signal is applied, and a source electrode maintained at ground, and an element for supplying a supply voltage to the drain electrode of the second MOS transistor and the source electrode of the third transistor.

In accordance with the present invention, there is also provided a circuit for comparing first and second n-bit binary signals, comprising N-bit comparing circuits each comprising a first n-channel MOS transistor having a gate electrode to which a first binary signal is applied, a second n-channel MOS transistor having a source electrode connecting to a source electrode of the first MOS transistor, and a gate electrode to which a third binary signal different in logical level from the first binary signal is applied, a third n-channel MOS transistor having a source electrode connecting to a drain electrode of the first MOS transistor, and a gate electrode to which a second binary signal is applied, a fourth n-channel MOS transistor having a source electrode connecting to a drain electrode of the second MOS transistor, and a gate electrode to which a fourth binary signal different in logical level from the second binary signal is applied, an output port connected to a drain electrode of the third MOS transistor and a drain electrode of the fourth MOS transistor, an auxiliary input port connected to the source electrode of the first MOS transistor and the source electrode of the second MOS transistor, a fifth n-channel MOS transistor having a drain electrode connecting to the drain electrode of the first MOS transistor and the source electrode of the third MOS transistor, a gate electrode to which the third binary signal is applied, and a source electrode maintained at ground, and an element for supplying a supply voltage to the drain electrode of the second MOS transistor and the source electrode of the fourth MOS transistor. The 1-bit comparing circuits are cascaded in n consecutive stages with the output ports and auxiliary input ports of the 1-bit comparing circuits adjacent to each other being connected to each other, and each bit of the first n-bit binary signal being supplied as the first binary signal to each of the n 1-bit comparing circuits in gate electrode of the first n-channel MOS transistor while each bit of the second n-bit binary signal being supplied as the second binary signal to each of the n 1-bit comparing circuits in the gate electrode of the third n-channel MOS transistor.

BRIEF DESCRIPTION OF THE DRAWINGS

The above and other objects, features and advantages of the present invention will become more apparent from the following detailed description taken in conjunction with the accompanying drawings in which:

FIG. 1 is a circuit diagram schematically showing a first embodiment of the comparing circuit in accordance with the present invention;

FIG. 2 is a circuit diagram representative of a second embodiment of the present invention;

FIG. 3 is a circuit diagram representative of a third embodiment of the present invention.

DESCRIPTION OF THE PREFERRED EMBODIMENTS

Figure 4:
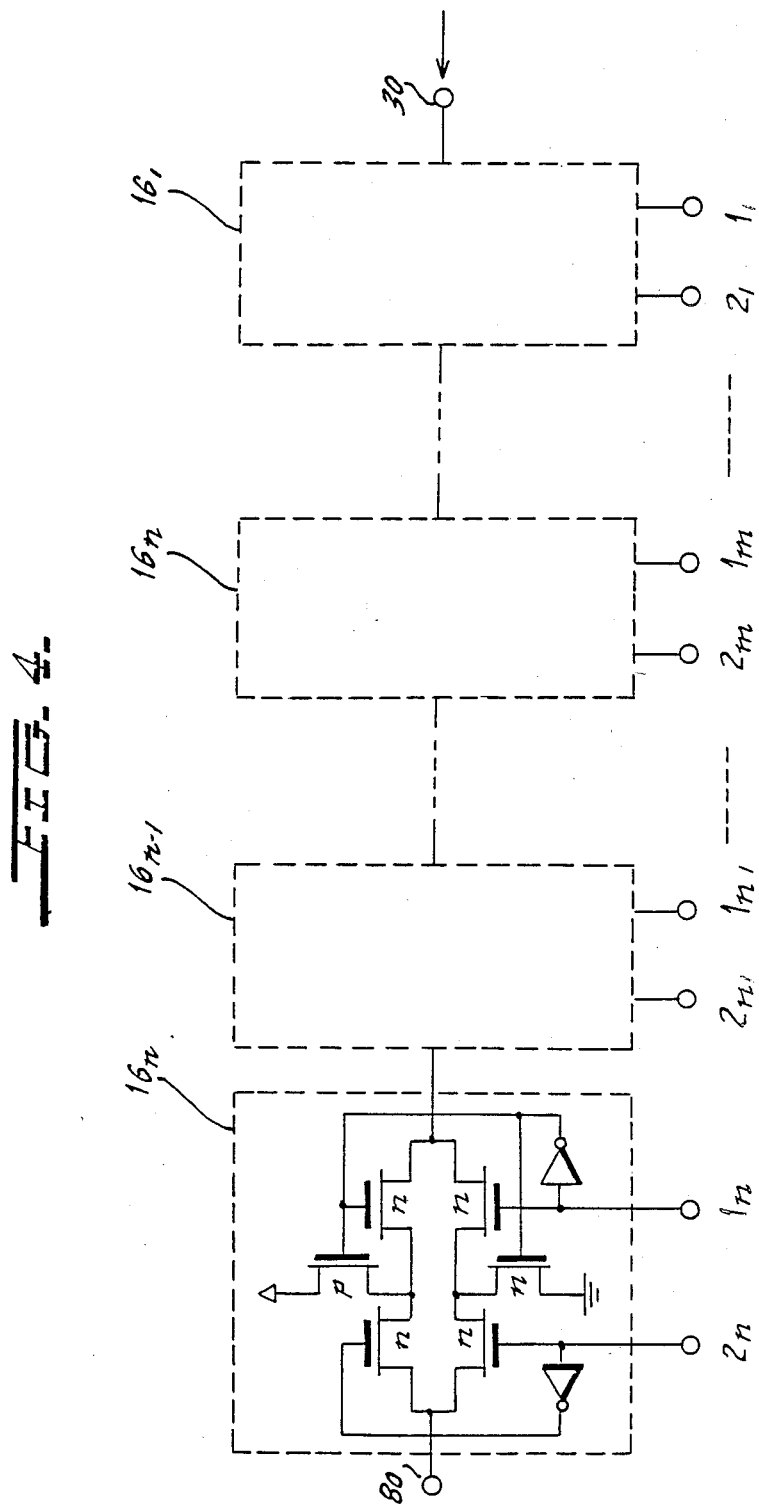
FIG. 4 is a circuit diagram representative of a fourth embodiment of the present invention.

Referring to FIG. 1 of the drawings, a first embodiment of the present invention is shown. As shown, a 1-bit binary signal comparing logic circuit 100 receives two 1-bit binary signals at input terminals 9 and 11 and produces an output representative of a result of comparison at an output terminal 8. The comparing circuit 100 includes a first, second, third, fourth and fifth n-channel metal-oxide semiconductor field-effect transistors (MOSFETs) 1, 2, 4, 6 and 7, a p-channel MOSFET 5, and inverters 10 and 12.

The first and second n-channel MOSFETs 1 and 2 each has a source electrode connecting to an auxiliary input terminal 3. The third n-channel MOSFET 4 has a source electrode connecting to a drain electrode of the MOSFET 1 and a drain electrode of the n-channel MOSFET 7. The fourth n-channel MOSFET 6 has a source electrode connecting to drain electrodes of the n-channel MOSFET 2 and p-channel MOSFET 5. The n-channel MOSFETs 4 and 6 have drain electrodes connecting to the output terminal 8. The input terminal 9 is connected to an input terminal of the inverter 10 and a gate electrode of the transistor 1. The output terminal of the inverter 10 is connected to a gate electrode of the p-channel transistor 5 and to gate electrode of the n-channel transistors 2 and 7. The input terminal 11 is connected to an input terminal of the inverter 12 and to a gate electrode of the transistor 4. The output terminal of the inverter 12 is connected to a gate electrode of the transistor 6. Further, the transistor 5 has a source electrode connecting to a positive power source $V_{dd}$, and the transistor 7 has a source electrode connecting to ground.

Assume that the potential of the positive power source $V_{dd}$ is a ONE in terms of logical level and that the potential at the ground level is a ZERO. Then, when a ONE signal and a ZERO signal are respectively applied to the input terminals 9 and 11, the transistors 1 and 6 which receive the ONE signal at their gate electrodes and the transistor 5 which receives the ZERO signal at its gate electrode are turned on while, at the same time, the transistors 2, 7 and 4 which receive the ZERO signal at their gate electrodes are turned off. As a result, the output terminal 8 is connected to the positive power source $V_{dd}$ and, therefore, a ONE appears on the output terminal 8.

Conversely, when a ZERO signal and a ONE signal are respectively applied to the input terminals 9 and 11, the transistors 2, 7 and 4 are turned on and the transistors 5, 1 and 6 are turned off. In this condition, the output terminal 8 is connected to ground via the transistors 4 and 7 with the result that a ZERO appears on the output terminal 8.

When a ZERO signal is applied to both of the input terminals 9 and 11, the transistors 2, 6 and 7 are rendered conductive and the transistors 5, 1 and 4 are rendered non-conductive. On the other hand, when a ONE signal is applied to both of the input terminals 9 and 11, the transistors 1, 4 and 5 are turned on and the transistors 2, 6 and 7 are turned off. In any of such cases, therefore, a signal having the same logical level as the signal applied to the auxiliary input terminal 3 appears on the output terminal 8.

With the above construction, the circuit of FIG. 1 produces a ONE on the output terminal 8 when the binary signal applied to the input terminal 9 is greater than the binary signal applied to the input terminal 11 with respect to the logical level. It produces a ZERO on the output terminal 8 when the binary signal applied to the input terminal 9 is smaller than the binary signal applied to the input terminal 11. Further, when the same binary signal is applied to the input terminals 9 and 11, the circuit produces on the output terminal 8 the logical level of a signal which is applied to the auxiliary input terminal 3. It is to be noted that the logical level of the signal applied to the auxiliary input terminal 3 is set to a ONE and ZERO depending upon which of "greater than" and "greater than or equal to" is selected to express the relationship between two input binary signals, respectively.

Referring to FIGS. 2 and 3, a second and a third embodiment of the present invention are shown, respectively. In FIGS. 2 and 3, the same or similar structural elements as those shown in FIG. 1 are designated by like reference numerals.

A logical 1-bit binary signal comparing circuit 200 shown in FIG. 2 is different from the circuit 100 of FIG. 1 in that it includes a p- or n-channel MOS transistor 51 in place of the p-channel MOS transistor 5 and connects a gate and a source electrode of the transistor 51 directly to each other. In this embodiment the transistor 51 is used as a load. Since the transistor 51 is the load transistor, it can be replaced with a resistor 52 as shown in FIG. 3. In each of the embodiments of FIGS. 2 and 3, the output changes in the same manner as in the embodiment of FIG. 1 in response to two input binary signals.

In the embodiments of FIGS. 1, 2 and 3, the inverters 10 and 12 are shown as being respectively connected between the input terminal 9 and the gate electrode of the transistor 2 and between the input terminal 11 and the gate electrode of the transistor 6. Alternatively, the inverters 10 and 12 may be respectively interposed between the input terminal 9 and the gate electrode of the transistor 1 and between the input terminal 11 and the gate electrode of the transistor 4. Another possible arrangement may be such that the first to five n-channel MOSFETs 1, 2, 4, 6 and 7 are each replaced with a p-channel MOSFETs and the drains and sources of the p-channel transistors are connected in the opposite manner to the case with the n-channel transistors. Such an arrangement is rather impractical, however, partly because the operation is slowed down and partly because the potential of a ZERO becomes higher than the ground level.

Referring to FIG. 4, there is shown a specific construction of a n-bit binary signal comparing logic circuit which is basically implemented by the circuit of FIG. 1. The circuit of FIG. 4 is constructed to compare an n-bit binary signal which is applied to input terminals $1_1$ to $1_n$ and another n-bit binary signal which is applied to input terminals $2_1$ to $2_n$. More specifically, 1-bit comparing circuits $16_1$ to $16_n$ are each constituted by the 1-bit binary signal comparing circuit of FIG. 1, and the auxiliary input terminals and output terminals 8 of the nearby 1-bit comparing circuits are interconnected. The logical levels of the least significant bit applied to the input terminals $1_1$ and $2_1$ to the logical levels of the most significant bit applied to the input terminals $1_n$ and $2_n$ are compared at the same time on a bit basis. Assume that the bit position to be compared is the m bit (m=2, 3, .., n−1). Then, the 1-bit comparing circuit $16_m$ at the m bit produces a ONE when the logical level of the binary signal applied to the input terminal $1_m$ is greater than the binary signal applied to the input terminal $2_m$, a ZERO when the former is smaller than the latter, and a result of comparison associated with the bit one bit lower than m, i.e., the result of comparison associated with the m−1 bit when they are equal to each other. Further, when all of the most significant bit to the least significant bit are the same in logical level, the output level can be controlled on the basis of the logical level of a signal which is applied to the input terminal 30 of the least significant bit. Accordingly, the result of comparison of n-bit binary signals is produced from the output terminal 80 of the comparing circuit which is assigned to the most significant bit. Again, the logical level of the signal to be applied to the auxiliary input terminal depends upon which of "greater than" and "greater than or equal to" is adopted in expressing the relationship between the two n-bit binary signals.

In summary, the present invention provides a binary signal comparing circuit which needs a minimum number of elements, i.e., only five n-channel MOSFETs and two gates, thereby reducing the current consumption and chip area of a semiconductor integrated circuit. Moreover, the circuit of the present invention readily implements the comparison of binary signals each having any desired number of bits by a bit slice construction.

Various modifications will become possible for those skilled in the art after receiving the teachings of the present disclosure without departing from the scope thereof.

What is claimed is:

1. A circuit for comparing first and second binary signals, comprising:
    a first n-channel MOS transistor having a gate electrode to which the first binary signal is applied;
    a second n-channel MOS transistor having a source electrode connecting to a source electrode of said first MOS transistor, and a gate electrode to which a third binary signal different in logical level from the first binary signal is applied;
    a third n-channel MOS transistor having a source electrode connecting to a drain electrode of said first MOS transistor, and a gate electrode to which the second binary signal is applied;
    a fourth n-channel MOS transistor having a source electrode connecting to a drain electrode of said second MOS transistor, and a gate electrode to which a fourth binary signal different in logical level from the second binary signal is applied;
    an output port connected to a drain electrode of said third MOS transistor and a drain electrode of said fourth MOS transistor;
    a fifth n-channel MOS transistor having a drain electrode connecting to the drain electrode of said first MOS transistor and the source electrode of said third MOS transistor, a gate electrode to which the third binary signal is applied, and a source electrode maintained at ground; and
    an element for supplying a supply voltage to the drain electrode of said second MOS transistor and the source electrode of said fourth transistor.

2. A circuit as claimed in claim 1, wherein when the first and second binary signals are different in logical level from each other, said second MOS transistor, said third MOS transistor and said fifth MOS transistors are turned on and said first MOS transistor and said fourth MOS transistor are turned off or said second MOS transistor, said third MOS transistor and said fifth MOS transistor are turned off and said first MOS transistor and said fourth MOS transistor are turned on and, when the first and second binary signals are equal in logical level to each other, said second MOS transistor and said fourth MOS transistor are turned on or said first MOS transistor and said third MOS transistor are turned on.

3. A circuit as claimed in claim 1, wherein an auxiliary input signal is applied to the source of said second MOS transistor and the source of said first MOS transistor.

4. A circuit as claimed in claim 1, wherein said supplying element comprises a p-channel MOS transistor.

5. A circuit as claimed in claim 1, wherein said supplying element means comprises a load MOS transistor.

6. A circuit as claimed in claim 1, wherein said supplying element comprises a resistor.

7. A circuit for comparing first and second N-bit binary signals where N is a non-zero positive integer, comprising N 1-bit comparing circuits each comprising:
    a first n-channel MOS transistor having a gate electrode to which a first binary signal is applied;
    a second n-channel MOS transistor having a source electrode connecting to a source electrode of said first MOS transistor, and a gate electrode to which a third binary signal different in logical level from the first binary signal is applied;
    a third n-channel MOS transistor having a source electrode connecting to a drain electrode of said first MOS transistor, and a gate electrode to which a second binary signal is applied;
    a fourth n-channel MOS transistor having a source electrode connecting to a drain electrode of said second MOS transistor, and a gate electrode to which a fourth binary signal different in logical level from the second binary signal is applied;
    an output port connected to a drain electrode of said third MOS transistor and a drain electrode of said fourth MOS transistor;
    an auxiliary input port connected to the source electrode of said first MOS transistor and the source electrode of said second MOS transistor;
    a fifth n-channel MOS transistor having a drain electrode connecting to the drain electrode of said first MOS transistor and the source electrode of said third MOS transistor, a gate electrode to which the third binary signal is applied, and a source electrode maintained at ground;
    and an element for supplying a supply voltage to the drain electrode of said second MOS transistor and the source electrode of said fourth MOS transistor;
    said 1-bit comparing circuits being cascaded in N consecutive stages with said output ports and said auxiliary input ports of said 1-bit comparing circuits adjacent to each other being connected to each other; and
    each bit of said first N-bit binary signal being supplied as said first binary signal to each of said N 1-bit comparing circuits on the gate electrode of said first n-channel MOS transistor while each bit of said second N-bit binary signal being supplied as said second binary signal to each of said N 1-bit comparing circuits on the gate electrode of said third n-channel MOS transistor.

8. A circuit for comparing first and second binary signals comprising:
    first, second, third, fourth and fifth n-channel MOS transistors;
    the sources of said first and second MOS transistors connected at a first common node; the drain of said second MOS transistor and the source of said fourth MOS transistor being connected at a second common node; the drains of said third and fourth MOS transistors being connected at a third common node; the drains of said first and fifth MOS transistors and the source of said third MOS transistor being connected at a fourth common node;
    first and second input terminals connected to the gates of said first and third MOS transistors, respectively, for inputting said first and second binary signals, respectively;

means for providing third and fourth binary signals to the respective gates of said second and fourth MOS transistors, respectively, said third and fourth binary signals respectively being different in logical level from said first and second binary signals an output terminal connected to said third common node;

a power terminal for connecting the circuit to an external power source providing a supply voltage, said power terminal being connected within said circuit to an element for supplying said supply voltage to said second common mode; and a ground terminal for connecting the source of said fifth MOS transistor to ground.

9. A circuit as claimed in claim 8, wherein when the first and second binary signals are different in logical level from each other, said second MOS transistor, said third MOS transistor and said fifth MOS transistor are turned on and said first MOS transistor and said fourth MOS transistor are turned off or said second MOS transistor, said third MOS transistor and said fifth MOS transistor are turned off and said first MOS transistor and said fourth MOS transistor are turned on and, when the first and second binary signals are equal in logical level to each other, said second MOS transistor and said fourth MOS transistor are turned on or said first MOS transistor and said third MOS transistor are turned on.

10. A circuit as claimed in claim 8, further comprising an auxiliary input terminal for connecting a third binary signal to the source of said first and second n-channel MOS transistors.

11. A circuit as claimed in claim 10, wherein when the first and second binary signals are equal in logic level to each other, the logic level on said output terminal is equal to the logic level of said third binary signal.

12. A circuit as claimed in claim 8, wherein said element for supplying said supply voltage comprises a p-channel MOS transistor.

13. A circuit as claimed in claim 8, wherein said element for supplying said supply voltage comprises a resistor.

14. A circuit as claimed in claim 8, further comprising a plurality of said comparing circuits cascaded in N consecutive stages with said output terminals and said auxiliary input terminals of said circuits adjacent to each other being connected to each other to form a circuit for comparing first and second N-bit binary signals, where N is a non-zero positive integer;

wherein each bit of said first N-bit binary signal is supplied as said first binary signal to each of said N 1-bit comparing circuits on the gate electrode of said first n-channel MOS transistor, while each bit of second N-bit binary signal is supplied as said second binary signal to each of said N comparing circuits on the gate electrode of said third n-channel MOS transistor.

* * * * *